United States Patent
Annampedu

(10) Patent No.: US 7,072,130 B2
(45) Date of Patent: Jul. 4, 2006

(54) AUTO-RANGING ATTENUATORS FOR READ CHANNELS

(75) Inventor: Viswanath Annampedu, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/900,545

(22) Filed: Jul. 28, 2004

(65) Prior Publication Data

US 2006/0023328 A1 Feb. 2, 2006

(51) Int. Cl.
G11B 5/09 (2006.01)
G11B 5/02 (2006.01)

(52) U.S. Cl. .................... 360/46; 360/67; 360/68; 330/124; 330/133; 330/134; 369/124.11

(58) Field of Classification Search ............... None
See application file for complete search history.

(56) References Cited

U.S. PATENT DOCUMENTS

| | | | | |
|---|---|---|---|---|
| 4,991,034 A * | 2/1991 | Sato | ............................ | 360/67 |
| 5,101,310 A * | 3/1992 | Brown | ........................ | 360/68 |
| 5,247,509 A * | 9/1993 | Nakane et al. | ............... | 369/116 |
| 5,422,760 A * | 6/1995 | Abbott et al. | .................. | 360/46 |
| 6,141,169 A * | 10/2000 | Pietruszynski et al. | ....... | 360/67 |
| 6,268,974 B1 * | 7/2001 | Sloan et al. | ................... | 360/67 |
| 6,285,863 B1 * | 9/2001 | Zhang | ..................... | 455/234.1 |
| 6,307,885 B1 * | 10/2001 | Moon et al. | ........... | 375/240.08 |
| 6,411,235 B1 * | 6/2002 | Gurusami et al. | .......... | 341/139 |
| 6,621,368 B1 * | 9/2003 | Tiihonen et al. | ........... | 333/17.1 |
| 2004/0105357 A1 * | 6/2004 | Shioya et al. | ............. | 369/44.29 |
| 2004/0189382 A1 * | 9/2004 | Dauphinee et al. | .......... | 330/129 |
| 2005/0157626 A1 * | 7/2005 | Lin et al. | ................ | 369/124.11 |

* cited by examiner

Primary Examiner—Wayne Young
Assistant Examiner—Dismery Mercedes

(57) ABSTRACT

A recording system, such as a magnetic or optical recording system, sets input attenuation level setting and variable gain amplifier (VGA) operating region during zero gain start (ZGS) by sharing the ZGS adjustment between attenuator settings and VGS gain setting. Further adjustment is made to attenuator settings and VGS gain setting for each subsequent servo or read sector event. The input attenuation level setting and variable gain amplifier (VGA) operating region are set so as to minimize effects of gain error due to incorrect attenuator setting, and subsequently operate the VGA near the center of its range where the non-linear effects are minimal.

33 Claims, 2 Drawing Sheets

AUTO-RANGING ATTENUATORS FOR READ CHANNELS

BACKGROUND OF THE INVENTION

1. Field of the Invention

The present invention relates to data transfer through a communication system channel, and, more particularly, to signal adjustment for detection of data information from a recording medium.

2. Description of the Related Art

A read channel component is an integrated circuit (IC) of a computer hard disk (HD) drive that encodes, detects, and decodes data, enabling a read/write head to correctly i) write data to the disk drive and ii) read back the data. The disks in an HD drive have a number of tracks, each track consisting of i) user (or "read") data sectors and ii) control (or "servo") data sectors embedded between the read sectors. Information stored in the servo sectors is employed to position the head (e.g., a magnetic recording/playback head) over a track so that the information stored in the read sector can be retrieved properly.

A servo sector typically comprises a servo preamble, an encoded servo address mark (SAM), encoded Gray data, a burst demodulation (demod) field, and a repeatable run-out (RRO) field. The servo preamble allows for timing recovery and gain adjustment of the written servo data. The SAM is an identifier of fixed bit-length that identifies the data as servo data, with the value for this identifier the same for all servo sectors. Gray data represents the track number/cylinder information and provides coarse positioning information for the head. The burst demod field provides fine positioning information for the head. RRO field data provides head positioning information that is i) finer than that provided by Gray data and ii) coarser than that provided by the burst demodulation fields. Specifically, RRO field data is typically employed to compensate for when the head does not follow a circular track around the disk. The read sector comprises a read preamble, a read address mark (RAM), and encoded user data. The read preamble also provides for timing recovery and gain adjustment, and the RAM identifies the read sector user data.

When the head of a recording system reads data from a sector of an HD, the data is provided as an analog signal (readback signal) that is subsequently level-adjusted, equalized, and sampled for further digital signal processing to detect and decode the sector information. Some older prior-art systems may perform analog rather than digital signal processing of the read signal. For level-adjustment, prior-art read channel components typically employ one or more attenuator stages and a variable gain amplifier (VGA) to adjust the readback signal provided from the head to a desired level before further processing.

The one or more attenuators provide coarse level-adjustment of the readback signal by attenuation, while the VGA provides fine level-adjustment through variable signal gain. The VGA has a finite range of operation. If the attenuator settings are too high or too low, the VGA may not be able to compensate for the gain error introduced by incorrect attenuator settings and may saturate at the VGA lower or upper gain (or "rail").

At the beginning of a read or servo event (i.e., when the read or servo sector is being read), the prior-art read channel component performs a zero gain start (ZGS) to quickly predict the gain error in the readback signal prior to acquisition of the readback signal's gain and timing. Signal timing and gain acquisition over the preamble field is referred to as the "acquire mode" (ACQ mode). Since the preamble pattern (e.g., 2T pattern of 11001100...) is known over a preamble field, prior-art systems employ efficient decision-directed (DD) algorithms for acquisition of gain and timing over this field, and using a substantial number of the preamble bits for this acquisition. The gain adjustment is estimated by a ZGS circuit that is provided entirely to a VGA register (which sets the VGA gain) so that adaptive gain adjustment of the DD algorithm starts from a relatively close starting point (i.e., the DD algorithm starts with an almost correct VGA gain as predicted by the ZGS circuitry).

After the ZGS, gain of the VGA is determined automatically (within its finite range of operation) by the read channel component using an adaptive signal-processing algorithm. However, prior-art setting of the attenuation is not an adaptive process. HD drive manufacturers determine off-line an appropriate level of attenuation for different sectors of an HD (a time-consuming and cumbersome process), and then program the read channel's attenuation setting for different sectors in firmware. Pre-programming attenuation levels provides for several problems in prior-art systems.

For example, when a "head switch" occurs (e.g., when a different head in a different disk platter is selected for reading/writing the data), large gain error (e.g., +/−12 dB) from the nominal readback signal amplitudes can occur. Also, the VGA operates best within a linear range of operation near the center of its gain range. VGA performance deteriorates due to non-linear effects when the VGA operates near its lower and upper range levels.

In addition, the ZGS adjustment is dependent on the attenuator setting. For example, for a particular attenuator setting of −12 dB, VGA adjustment range of 0 to 24 dB, and VGA gain setting at the range center (12 dB), a ZGS adjustment of −12 dB adds −12 db to the VGA register which puts the VGA register at its lower limit of 0 dB. Consequently, this ZGS adjustment drives the operation of the VGA to the lower rail. This indicates that the selected attenuation is not adequate, and the incoming signal amplitude is very high.

SUMMARY OF THE INVENTION

In accordance with one embodiment of the present invention, a level of a readback signal is dynamically adjusted by: (a) detecting an event in the readback signal; (b) generating a zero gain start (ZGS) adjustment value for the event; (c) dividing the ZGS adjustment value into an attenuator portion and a gain portion; and (d) adjusting: i) an attenuation, by at least one attenuator, of the readback signal based on the attenuator portion, and ii) a gain, by a variable gain amplifier (VGA), of the readback based on the gain portion, wherein the gain portion tends to adjust the gain of the VGA within a predefined sub-range.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
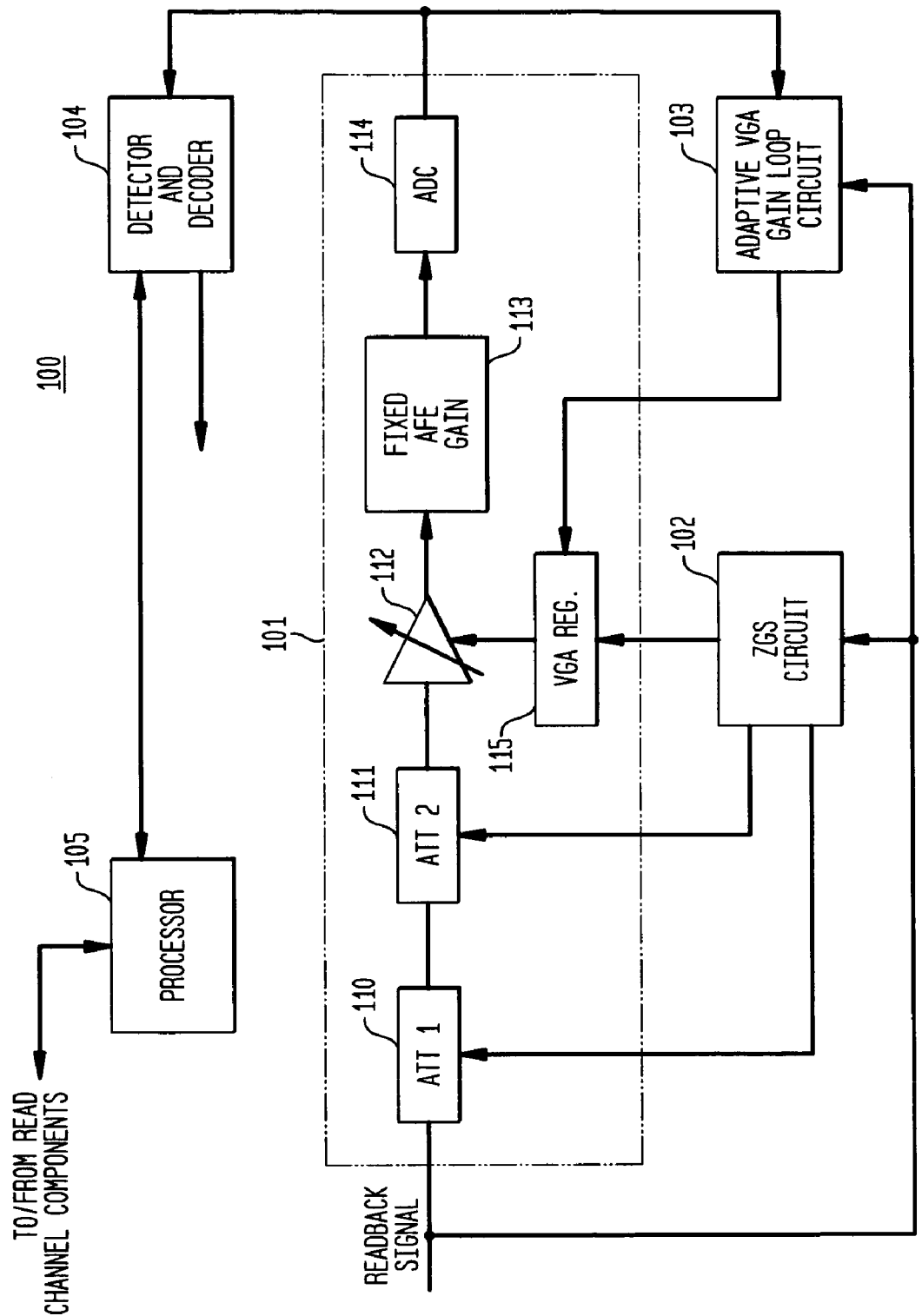
FIG. 1 shows a read channel component operating in accordance with exemplary embodiments of the present invention.

FIG. 1 shows read channel component 100 operating in accordance with exemplary embodiments of the present invention. Read channel component 100 comprises analog front end (AFE) 101 having attenuator (ATT1) 110, attenuator (ATT2) 111, variable gain amplifier (VGA) 112, fixed AFE gain 113, analog-to-digital converter (ADC) 114, and VGA register (reg) 115. Read channel component 100 further comprises zero gain start (ZGS) circuit 102, adaptive VGA gain loop circuit 103, detector and decoder 104, and processor 105.

ATT1 110 and ATT2 111 attenuate an input readback signal in accordance with corresponding settings. The read back signal is typically coupled to AFE 101 from the preamp of the read/write head assembly by A/C coupling stages (not shown in FIG. 1). The readback signal is attenuated first by ATT1 110 and then by ATT2 111. Typically, one of ATT1 110 and ATT2 111 is configured to settle faster than the other. For the described embodiment, ATT1 110 has a longer settling period than ATT2 111. Consequently, attenuation of ATT1 110 is adjusted only at the beginning or at the end of a servo event or a read event. ATT2 111 settles such that adjustment of the attenuation of ATT2 111 corrupts few, if any, samples during an event.

VGA 112 applies gain to the signal from ATT2 111 to adjust the readback signal to a desired level. Gain of VGA 112 is set by the value of VGA reg 115. VGA 112 operates substantially linearly in a range of low- to high-gain (upper and lower rails, respectively). Fixed AFE gain 113 represents gain added to the output signal of VGA 112 by other circuit components, such as an equalizer. The signal from fixed AFE gain 113 is quantized into digital samples by ADC 114.

ZGS circuit 102 monitors the readback signal. During acquire (ACQ) mode (at the beginning of a read or a servo event), ZGS circuit 102 generates i) attenuation settings for ATT1 110 and ATT2 111 and ii) a gain setting for VGA 112 in accordance with an exemplary embodiment of the present invention, as described subsequently. After gain adjustment by ZGS circuit 102, adaptive VGA gain loop processor 103 implements an algorithm, such as an adaptive, decision-directed (DD) gain control algorithm, to maintain the signal applied to ADC 114 at a desired level by adjusting the gain of VGA 112. For example, the DD gain control algorithm might operate based on minimizing the least mean square (LMS) error between the actual and desired signal level outputs from ADC 114.

Detector and decoder 104 is employed to detect and decode read and servo event data. Operation of elements of read channel component 100 might be coordinated by processor 105.

In accordance with exemplary embodiments of the present invention, i) input attenuation level of, for example, ATT1 110, ATT2 111, and ii) gain of VGA 112 are set during ZGS so as to share the ZGS signal level adjustment (ZGS adjustment) between the attenuator settings and the VGA gain setting. Further adjustment is made for each subsequent servo or read sector event. While attenuation by the fast and slow settling attenuators and the gain by the VGA are shown in the FIGS. in a specific order, the present invention is not so limited. The order of attenuation and gain, as well as the number of attenuators and gain stages, might vary depending on a given implementation.

As an aid to understanding of the present invention, the exemplary embodiment is described with respect to the following configuration. Attenuation settings for ATT1 110 correspond to attenuation levels of 0,4,8, and 12 dB, and attenuation settings for ATT2 111 correspond to attenuation levels 0,2,4,6, and 8 dB. VGA 112 has a linear range of gain of 0 to 24 dB. The gain of fixed AFE gain 113 is 12 dB. ADC 114 provides one LSB change for every 15 mV (millivolts), where an LSB is a quantization level of the ADC. Thus, to achieve about ±20 LSBs at the output terminal of ADC 114, the input signal to ADC 114 is about 600 mV.

For example, if the ZGS adjustment for the initially detected read or servo event is −12 dB, then instead of correcting for the entire −12 dB gain error by adjustment of the VGA register as in the prior art, the exemplary embodiment accounts for only a portion of the ZGS adjustment value (up to the maximum attenuation level supported in the particular attenuator implementation) in the attenuator setting. The remaining portion of the ZGS adjustment is accounted for in adjustment of the gain value of the VGA register. For example, if the maximum attenuation possible is 6 dB, 6 dB of attenuation is selected in the attenuator and −6B is accounted for (12−6=6dB) in the VGA register. Since the VGA gain is not near the rails, the VGA has head-room for adaptation of the VGA gain.

Figure 2:
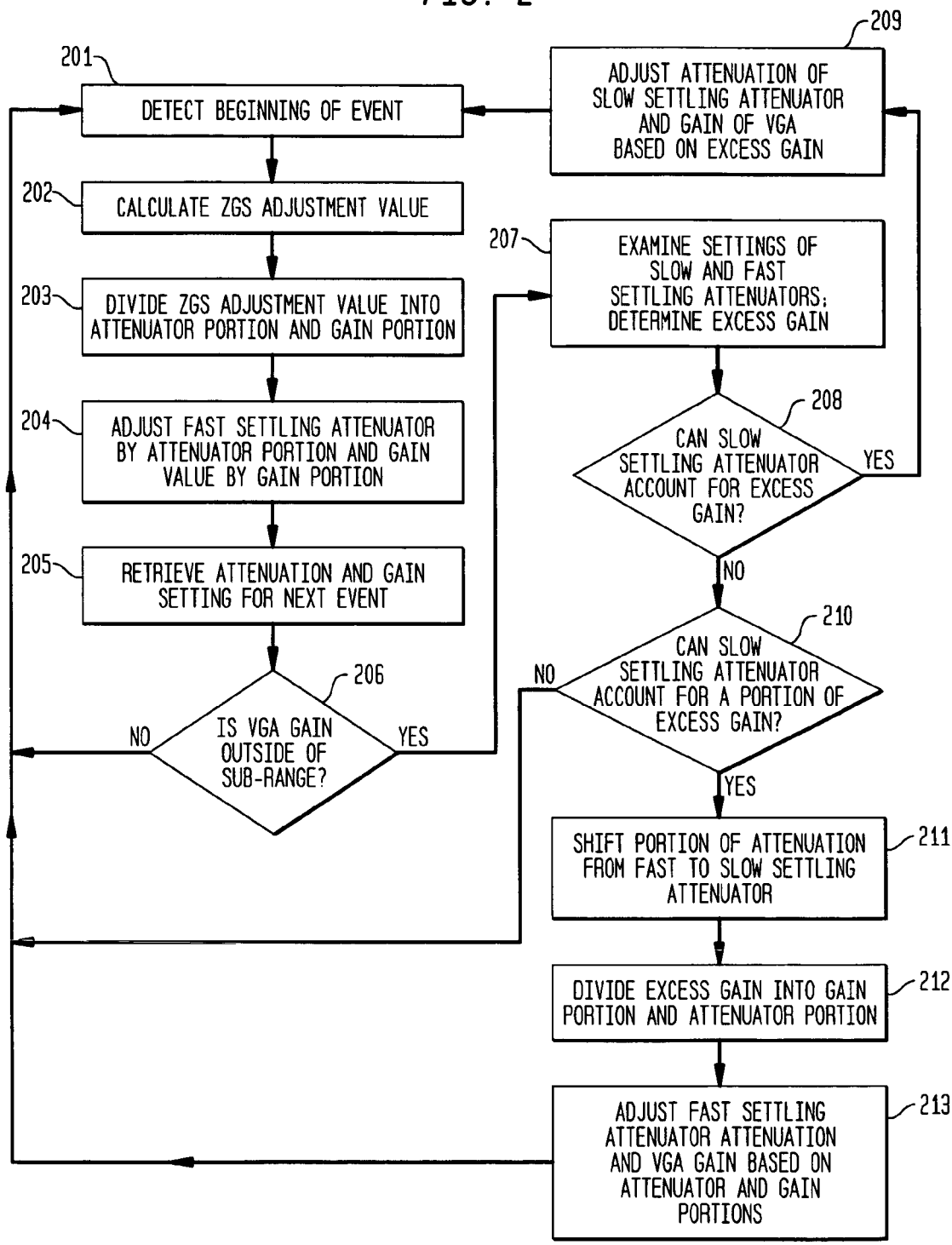
FIG. 2 shows an exemplary method of setting attenuation and gain for the AFE of FIG. 1.

FIG. 2 shows an exemplary method of setting attenuation and gain in accordance with the present invention. At step 201, the beginning of a read or servo sector event is detected. At step 202, a ZGS adjustment value is calculated by, for example, ZGS circuit 102 of FIG. 1.

At step 203, the ZGS adjustment value is divided into an attenuator portion and a gain portion. For the described embodiment herein, the division might be in 2dB steps since the attenuators settings are in 2–dB increments. For the initial read or servo sector event, the division (ratio of attenuator portion to total ZGS adjustment value and ratio of gain portion to total ZGS adjustment value) might be predetermined offline. Also, the initial setting of the attenuator having the slower settling time (e.g., ATT1) might be predetermined offline. Alternatively, the ratio might be calculated during ACQ mode based on a current setting of the gain register such that the gain portion operates the VGA within a defined sub-range about its center gain, unless the attenuators are at their maximum attenuation settings.

At step 204, the attenuation setting of the attenuator having the fastest settling time is adjusted by the attenuator portion, and the VGA gain value (of, e.g., VGA register 115) is adjusted by the gain portion. At step 205, the attenuation and gain settings are retrieved. During processing of the read or servo event, the gain control loop adjusting the gain of the VGA (e.g., adaptive VGA gain loop processor 103) further adjusts the gain value of the gain register based on the input level to the ADC. Consequently, step 205 begins a process to adjust the gain and attenuator settings so as to be able to handle subsequent events more effectively.

At step 206, a test determines whether the current value of VGA gain is outside of a predefined sub-range about center gain. If the test of step 206 determines that the current value of VGA gain is not outside of a predefined sub-range, then the method returns to step 201 to process the next read or servo event.

If the test of step 206 determines that the current value of VGA gain is outside of the predefined sub-range, then the method advances to step 207. At step 207, the attenuation settings of the slow and fast settling attenuators are examined, and an amount of excess VGA gain is determined. At step 208, a test determines whether the amount of excess VGA gain can be accounted for by the slow settling attenuator. If the test of step 208 determines that the amount of excess VGA gain can be accounted for by the slow settling attenuator, then, at step 209, the setting of the slow settling attenuator is adjusted to account for the excess VGA gain and the current value of VGA gain is adjusted to be within the sub-range. From step 209, the method returns to step 201.

If the test of step 208 determines that the amount of excess VGA gain can not be accounted for by the fast settling attenuator, then, at step 210, a test determines whether the slow attenuator can account for a portion of the excess gain. If the test of step 210 determines that the slow attenuator cannot account for a portion of the excess gain, then the method returns to step 201. If the test of step 210 determines that the slow attenuator can account for a portion of the excess gain, then the method advances to step 211.

At step 211, only a portion of the attenuation of the slow settling attenuator is adjusted and the remainder is accounted for in the attenuation of the fast settling attenuator. At step 212, the amount of excess VGA gain is divided into a gain portion and a fast settling attenuator portion. At step 213, the setting of the fast settling attenuator is adjusted to account for the excess VGA gain and the current value of VGA gain is correspondingly adjusted to be within the sub-range based on the gain portion. From step 213, the method returns to step 201.

The following example illustrates the method of FIG. 2. The readback signal amplitude might be between 45 mV and 500 mV, with 150 mV as the nominal value. Thus, the gain error has a swing of about +/−10.5 dB from the nominal value. Desirably, VGA 112 is operated such that its gain is near the center (12 dB) of its range to achieve +/−20 LSBs (for, for example, preamble detection level). Initially, the attenuation of ATT1 110 (FIG. 1) is set to −12 dB, the attenuation of ATT2 111 is set as 0 dB, and VGA gain is set to 12 dB. Attenuation of ATT1 110 and/or ATT2 111 is desirably set such that, for a nominal output voltage of the readback signal (~150 mV), the VGA input signal level is about 37.5 mV (providing an ADC output range of +/−20 LSBs). The VGA output level is 150 mV because of the initial 12-dB gain setting.

Re-distribution of the attenuation and gain between VGA 112, ATT1 110, and ATT2 111 for a read or servo event occurs as follows. The ZGS adjustment value is calculated, which ZGS adjustment value varies between +/−12dB (i.e., correct up to +/−12 dB of gain error). For example, if the ZGS adjustment value is −4.5 dB, then the ZGS adjustment is split between ATT2 111 (in steps of 2 dB) and the gain value for VGA 112. An additional 4 dB of attenuation is added to ATT2 111 and −0.5 dB gain is added to the gain value of VGA 112. Consequently, the gain range of VGA 112 is −11.5 dB to +12.5 dB.

The gain control loop implemented by adaptive VGA gain loop circuit 103 adaptively sets the gain of VGA 112 during the ACQ mode. Upon the end of ACQ mode, VGA gain is examined to see if some of the offset from its center (excess VGA gain) can be accounted for in ATT1 110 and ATT2 111 for the next read or servo event. For example, on top of −4 dB in ATT2 111 and −0.5 dB in VGA 112 after ZGS adjustment, if the VGA settles −3 dB from its center, another −2 db can be accounted for in ATT2 111 (for a total of −6dB). After adjusting the attenuation of ATT2 111, the gain of VGA 112 is at −1 dB off of its range center. Adjustments to attenuation of ATT2 111 can be made up to a maximum of 8 dB attenuation.

Alternatively, for a non-zero setting of ATT2 111, if the gain of VGA 112 settles on the positive side from its center, part of the gain can be accounted for (in 2 dB steps) in the attenuation of ATT2 111 by decreasing the attenuation up to a minimum of 0 dB.

Table 1 summarizes settings of ATT1, ATT2, and VGA for different gain error scenarios for a prior-art system having two attenuators and for the above example under different gain error scenarios and for two events.

TABLE 1

| Gain Error From 150 mV | Prior Art | | | Example, 1st Event | | | Example, 2nd Event | | |
|---|---|---|---|---|---|---|---|---|---|
| | ATT1 | ATT2 | VGA | ATT1 | ATT2 (after ZGS) | VGA (after ACQ) | ATT1 | ATT2 (after ZPS) | VGA (after ACQ) |
| +12 | −12 | 0 | 0 | −12 | −8 | 8 | −12 | −8 | 8 |
| +10 | −12 | 0 | 2 | −12 | −8 | 10 | −12 | −8 | 10 |
| +8 | −12 | 0 | 4 | −12 | −8 | 12 | −12 | −8 | 12 |
| +6 | −12 | 0 | 6 | −12 | −6 | 12 | −12 | −6 | 12 |
| +4 | −12 | 0 | 8 | −12 | −4 | 12 | −12 | −4 | 12 |
| +2 | −12 | 0 | 10 | −12 | −2 | 12 | −12 | −2 | 12 |
| 0 | −12 | 0 | 12 | −12 | 0 | 12 | −12 | 0 | 12 |
| −2 | −12 | 0 | 14 | −12 | 0 | 14 | −12 | 0 | 14 |
| −4 | −12 | 0 | 16 | −12 | 0 | 16 | −8 | 0 | 12 |
| −6 | −12 | 0 | 18 | −12 | 0 | 18 | −8 | 0 | 14 |
| −8 | −12 | 0 | 20 | −12 | 0 | 20 | −4 | 0 | 12 |
| −10 | −12 | 0 | 22 | −12 | 0 | 22 | −4 | 0 | 14 |
| −12 | −12 | 0 | 24 | −12 | 0 | 24 | 0 | 0 | 12 |

A read channel of a recording system operating in accordance with one or more embodiments of the present invention may exhibit the following advantages. Auto-adjustment of attenuation and gain in a read-channel component eliminates the off-line process of attenuation-level selection for proper VGA operation. In addition, auto-adjustment of attenuation and gain tends to operate the VGA within the center of its linear operating range, discouraging operation at or near the VGA rails, and allows for large variations in differing readback signal levels from different heads.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of dynamically adjusting a level of a readback signal, the method comprising the steps of:
   (a) detecting an event in the readback signal;
   (b) generating a zero gain start (ZGS) adjustment value for the event;
   (c) dividing the ZGS adjustment value into an attenuator portion and a gain portion; and (d) adjusting:
      i) an attenuation, by at least one attenuator, of the readback signal based on the attenuator portion, and
      ii) a gain, by a variable gain amplifier (VGA), of the readback signal toward to within a predefmed subrange based on the gain portion,
   wherein the at least one attenuator and the VGA are adapted to be selectively activated at the same time.

2. The invention as recited in claim 1, further comprising the step of (e) adaptively setting the VGA gain based on the readback signal.

3. The invention as recited in claim 2, further comprising the step of (f) repeating steps (a), (b), and (c) for a subsequent event.

4. The invention as recited in claim 3, wherein, for step (d), the attenuator comprises at least two attenuator stages, and wherein:
   step (c) comprises the step of dividing the attenuator portion into two or more attenuator stage portions corresponding to each attenuator stage.

5. The invention as recited in claim 4, wherein, for step (d), at least one attenuator stage is a slow settling attenuator and at least one other attenuator stage is a fast settling attenuator.

6. The invention as recited in claim 5, wherein, for step (d), the attenuator portion is divided between the slow settling attenuator and the fast settling attenuator.

7. The invention as recited in claim 1, wherein step (b) comprises the steps of (1) detecting a preamble in the readback data, and (2) generating the ZGS adjustment value during an acquire mode.

8. The invention as recited in claim 1, for step (a), the event is either a servo event for servo data in the readback signal or a read event for read data in the servo signal.

9. The invention as recited in claim 1, wherein the method is embodied as steps in a processor of an integrated circuit (IC).

10. The invention as recited in claim 9, wherein the method is implemented in a processor of either a magnetic recording system or an optical recording system.

11. The invention of claim 1, wherein the adjustments of the at least one attenuator and the VGA are substantially concurrent.

12. An apparatus for dynamically adjusting a level of a readback signal, the apparatus comprising:
   a zero gain start (ZGS) circuit adapted to generate a ZGS adjustment value for an event in a readback signal;
   a processor adapted to 1) divide the ZGS adjustment value into an attenuator portion and a gain portion; and 2) adjust:
      i) an attenuation, by at least one attenuator, of the readback signal based on the attenuator portion, and
      ii) a gain, by a variable gain amplifier (VGA), of the readback signal toward to within a predefmed subrange based on the gain portions
      wherein the at least one attenuator and the VGA are adapted to be selectively activated at the same time.

13. The invention as recited in claim 12, further comprising an adaptive VGA gain loop circuit configured to adaptively set the VGA gain based on the readback signal.

14. The invention as recited in claim 13, wherein the attenuator comprises at least two attenuator stages, and wherein the attenuator portion is divided into two or more attenuator stage portions corresponding to each attenuator stage.

15. The invention as recited in claim 14, wherein at least one attenuator stage is a slow settling attenuator and at least one other attenuator stage is a fast settling attenuator.

16. The invention as recited in claim 15, wherein the attenuator portion is divided between the slow settling attenuator and the fast settling attenuator.

17. The invention as recited in claim 12, wherein the ZGS circuit detects a preamble in the readback data and generates the ZGS adjustment value during an acquire mode.

18. The invention as recited in claim 12, wherein the event is either a servo event for servo data in the readback signal or a read event for read data in the servo signal.

19. The invention as recited in claim 12, wherein the apparatus is embodied in an integrated circuit (IC).

20. The invention as recited in claim 19, wherein the IC is implemented as a component of either a magnetic recording system or an optical recording system.

21. The invention of claim 12, wherein the adjustments of the at least one attenuator and the VGA are substantially concurrent.

22. A computer-readable medium having stored thereon a plurality of instructions, the plurality of instructions including instructions which, when executed by a processor, cause the processor to implement a method for dynamically adjusting a level of a readback signal, the method comprising the steps of:
   (a) detecting an event in the readback signal;
   (b) generating a zero gain start (ZGS) adjustment value for the event;
   (c) dividing the ZGS adjustment value into an attenuator portion and a gain portion; and
   (d) adjusting:
      i) an attenuation, by at least one attenuator, of the readback signal based on the attenuator portion, and
      ii) a gain, by a variable gain amplifier (VGA), of the readback signal toward to within a predefmed subrange based on the gain portion,.
   wherein the at least one attenuator and the VGA are adapted to be selectively activated at the same time.

23. A method of dynamically adjusting a level of a readback signal, the method comprising the steps of:
   (a) detecting an event in the readback signal;

(b) generating a zero gain start (ZGS) adjustment value for the event;
(c) dividing the ZGS adjustment value into an attenuator portion and a gain portion; and
(d) adjusting:
  i) an attenuation, by at least one attenuator, of the readback signal based on the attenuator portion, and
  ii) a gain, by a variable gain amplifier (VGA), of the readback signal toward to within a predefmed sub-range based on the gain portion,
wherein:
  step (c) comprises the step of dividing the attenuator portion into two or more attenuator stage portions corresponding to each attenuator stage;
  for step (d), the attenuator comprises at least two attenuator stages, at least one attenuator stage is a slow settling attenuator, and at least one other attenuator stage is a fast settling attenuator.

24. The invention as recited in claim 23, further comprising the step of (e) adaptively setting the VGA gain based on the readback signal.

25. The invention as recited in claim 23, further comprising the step of (f) repeating steps (a), (b), and (c) for a subsequent event.

26. The invention as recited in claim 23, wherein, for step (d), the attenuator portion is divided between the slow settling attenuator and the fast settling attenuator.

27. The invention as recited in claim 23, wherein step (b) comprises the steps of (1) detecting a preamble in the readback data, and (2) generating the ZGS adjustment value during an acquire mode.

28. A method of dynamically adjusting a level of a readback signal, the method comprising the steps of:
  (a) detecting an event in the readback signal;
  (b) generating a zero gain start (ZGS) adjustment value for the event;
  (c) dividing the ZGS adjustment value into an attenuator portion and a gain portion; and
  (d) adjusting:
    i) an attenuation, by at least one attenuator, of the readback signal based on the attenuator portion, and
    ii) again, by a variable gain amplifier (VGA), of the readback signal toward to within a predefmed sub-range based on the gain portion,
  wherein step (b) comprises the steps of (1) detecting a preamble in the readback data, and (2) generating the ZGS adjustment value during an acquire mode.

29. An apparatus for dynamically adjusting a level of a readback signal, the apparatus comprising:
  a zero gain start (ZGS) circuit adapted to generate a ZGS adjustment value for an event in a readback signal;
  a processor adapted to 1) divide the ZGS adjustment value into an attenuator portion and a gain portion, and 2) adjust:
    i) an attenuation, by at least one attenuator, of the readback signal based on the attenuator portion, and
    ii) a gain, by a variable gain amplifier (VGA), of the readback signal toward to within a predefmed sub-range based on the gain portion,
  wherein:
  the attenuator comprises at least two attenuator stages;
  the attenuator portion is divided into two or more attenuator stage portions corresponding to each attenuator stage;
  at least one attenuator stage is a slow settling attenuator; and at least one other attenuator stage is a fast settling attenuator.

30. The invention as recited in claim 29, further comprising an adaptive VGA gain loop circuit configured to adaptively set the VGA gain based on the readback signal.

31. The invention as recited in claim 29, wherein the attenuator portion is divided between the slow settling attenuator and the fast settling attenuator.

32. The invention as recited in claim 29, wherein the ZGS circuit detects a preamble in the readback data and generates the ZGS adjustment value during an acquire mode.

33. An apparatus for dynamically adjusting a level of a readback signal, the apparatus comprising:
  a zero gain start (ZGS) circuit adapted to generate a ZGS adjustment value for an event in a readback signal;
  a processor adapted to 1) divide the ZGS adjustment value into an attenuator portion and a gain portion; and 2) adjust:
    i) an attenuation, by at least one attenuator, of the readback signal based on the attenuator portion, and
    ii) a gain, by a variable gain amplifier (VGA), of the readback signal toward to within a predefmed sub-range based on the gain portion,
  wherein the ZGS circuit detects a preamble in the readback data and generates the ZGS adjustment value during an acquire mode.

* * * * *

UNITED STATES PATENT AND TRADEMARK OFFICE
CERTIFICATE OF CORRECTION

PATENT NO.         : 7,072,130 B2                               Page 1 of 1
APPLICATION NO. : 10/900545
DATED              : July 4, 2006
INVENTOR(S)        : Viswanath Annampedu It is certified that error appears in the above-identified patent and that said Letters Patent is hereby corrected as shown below:

In column 7, line 31, replace "predefmed" with --predefined--.

In column 8, line 14, replace "predefmed" with --predefined--.

In column 8, line 15, replace "portions" with --portion,--.

In column 9, line 42, replace "again" with --a gain--.

Signed and Sealed this

Twenty-sixth Day of September, 2006

JON W. DUDAS
*Director of the United States Patent and Trademark Office*